(12) United States Patent
Sato

(10) Patent No.: US 8,098,053 B2
(45) Date of Patent: Jan. 17, 2012

(54) CHARGER FOR LITHIUM ION SECONDARY BATTERY, AND METHOD OF CHARGING THE SAME

(75) Inventor: Masanao Sato, Fukushima (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 11/689,854

(22) Filed: Mar. 22, 2007

(65) Prior Publication Data

US 2007/0222416 A1    Sep. 27, 2007

(30) Foreign Application Priority Data

Mar. 23, 2006 (JP) ................... 2006-081619

(51) Int. Cl.
*H02J 7/06* (2006.01)
(52) U.S. Cl. .................. 320/163; 320/134; 320/156
(58) Field of Classification Search .................. 320/128, 320/134, 156, 161, 163
See application file for complete search history.

(56) References Cited

U.S. PATENT DOCUMENTS

| | | | |
|---|---|---|---|
| 5,408,170 A | * | 4/1995 | Umetsu et al. ............... 320/148 |
| 5,923,149 A | | 7/1999 | Umetsu |
| 6,137,265 A | * | 10/2000 | Cummings et al. ........... 320/133 |
| 2006/0087283 A1 | * | 4/2006 | Phillips et al. ................ 320/114 |

FOREIGN PATENT DOCUMENTS

JP          10-32938          2/1998

* cited by examiner

*Primary Examiner* — Edward Tso
*Assistant Examiner* — Aaron Piggush
(74) *Attorney, Agent, or Firm* — Oblon, Spivak, McClelland, Maier & Neustadt, L.L.P.

(57) ABSTRACT

A charger for a lithium ion secondary battery includes a series circuit of a reverse-current preventive switch, a charging switch and a current-detecting resistor, connected between the battery and the ground a charging control circuit controlling the reverse-current preventive switch and the charging switch, so as to make the battery repeat charging and opening at regular intervals, and so as to detect voltage difference between the specified voltage and the open circuit voltage of the battery during the opening; and a constant-current/constant-voltage control circuit commanding constant-current charging at a first set voltage set relatively high in a range not exceeding the upper limit voltage of the battery, so far as the voltage difference does not exceed a predetermined change-over voltage difference, and commanding constant-voltage charging at a second set voltage, which is lowered from the first set voltage, when the voltage difference becomes smaller than the change-over voltage difference.

11 Claims, 4 Drawing Sheets

CHARGER FOR LITHIUM ION SECONDARY BATTERY, AND METHOD OF CHARGING THE SAME

BACKGROUND OF THE INVENTION

1. Field of the Invention

The present invention relates to a charger for lithium ion secondary battery, and a method of charging the same.

2. Description of the Related Art

Lithium ion secondary batteries are generally charged based on constant-current/constant-voltage charging at 4.2 V per a single cell, as indicated by curves "a" and curves "b" in FIG. 4 and FIG. 5. In the charging based on combination of constant-current charging and constant-voltage charging, the lithium ion secondary battery is charged under constant current until the cell voltage reaches a set voltage Vc, and then under constant voltage, changed over from constant current, after the cell voltage reaches the set voltage Vc.

Known methods detecting an end point of charging of the lithium ion secondary battery include a current detection system shown in FIG. 4, in which lowering in the charging current caused by the constant-voltage charging in the constant-voltage charging period after the constant-current charging, is monitored, and the charging is terminated when a predetermined completion current $I_0$ is reached; and a $\Delta V$ detection system (see Japanese Patent Application Publication No. H10-32938) shown in FIG. 5, in which the charging period and the opening period are repeated at regular intervals, wherein voltage difference $\Delta V$ between a specified voltage (for example, upper limit voltage Vh of the lithium ion secondary battery) and the open circuit voltage Vt in the opening period is calculated, and the charging is terminated when the voltage difference $\Delta V$ falls in a range not exceeding a predetermined completion difference voltage $\Delta V0$.

Detection of the end point of charging of the lithium ion secondary battery requires charging under constant voltage, but the constant-voltage charging was disadvantageous in that the amount of charged energy decreased due to decrease in the charging current, so that the charging time was elongated.

One possible measure may be such as elevating the set voltage Vc where the constant-current charging and the constant-voltage charging are changed over, thereby elongating the charging time under constant current, and thereby shortening the charging time required up to completion of the charging. The elevation of the set voltage Vc, however, results in over-voltage in the constant-voltage charging period, because voltage loss is generated due to circuit impedance between the constant-current/constant-voltage control circuit and a charging terminal, and is therefore causative of degradation of the lithium ion secondary battery.

In general, there are upper limit values specified for the voltage value and the current value for the charging of lithium ion secondary batteries, and exceeding of these values may induce degradation of the lithium ion secondary batteries, raising a need of completing the charging within the specified upper limits.

SUMMARY OF THE INVENTION

Considering the situations, the present invention is aimed at shortening the charging time of lithium ion secondary batteries, without causing degradation thereof.

A charger for lithium ion secondary battery according to the present invention has a series circuit of a reverse-current preventive switch, a charging switch and a current-detecting resistor, connected between a lithium ion secondary battery to be charged and the ground; a charging control circuit controlling the reverse-current preventive switch and the charging switch, so as to make the lithium ion secondary battery repeat charging and opening at regular intervals, and so as to detect voltage difference between the specified voltage and the open circuit voltage of the lithium ion secondary battery during the opening; and a constant-current/constant-voltage control circuit commanding constant-current charging at a first set voltage which is set relatively high in a range not exceeding the upper limit voltage of the lithium ion secondary battery, so far as the voltage difference does not exceed a predetermined change-over voltage difference, and commanding constant-voltage charging at a second set voltage, which is lowered from the first set voltage, when the voltage difference becomes smaller than the change-over voltage difference.

A method of charging a lithium ion secondary battery according to the present invention is configured as repeating charging and opening of the lithium ion secondary battery at regular intervals, detecting voltage difference between the specified voltage and the open circuit voltage of the lithium ion secondary battery during the opening, performing constant-current charging at a first set voltage which is set relatively high in a range not exceeding the upper limit voltage of the lithium ion secondary battery, so far as the voltage difference does not exceed a predetermined change-over voltage difference, performing constant-voltage charging at a second set voltage, which is lowered from the first set voltage, when the voltage difference becomes smaller than the change-over voltage difference, and terminating the charging when the voltage difference becomes smaller than the predetermined change-over voltage difference.

The present invention is configured so as to perform constant-current charging at a first set voltage which is set relatively high in a range not exceeding the upper limit voltage of the lithium ion secondary battery, so far as the voltage difference between the specified voltage and the open circuit voltage of the lithium ion secondary battery does not exceed a predetermined change-over voltage difference, which is successful in elongating the charging time under constant current, and thereby shortening the charging time required up to completion of the charging, and also configured so as to perform constant-voltage charging at a second set voltage, which is lowered from the first set voltage, when the voltage difference becomes smaller than the change-over voltage difference, which is successful in avoiding over-voltage, and consequent degradation of the lithium ion secondary battery.

BRIEF DESCRIPTION OF THE DRAWINGS

The present invention will become more readily appreciated and understood from the following detailed description of embodiments and examples of the present invention when taken in conjunction with the accompanying drawings, in which.

DESCRIPTION OF THE INVENTION

An example for carrying out the charger for lithium ion secondary battery and the method of charging of the present invention will be explained, referring to FIG. 1 to FIG. 3.

Figure 1:
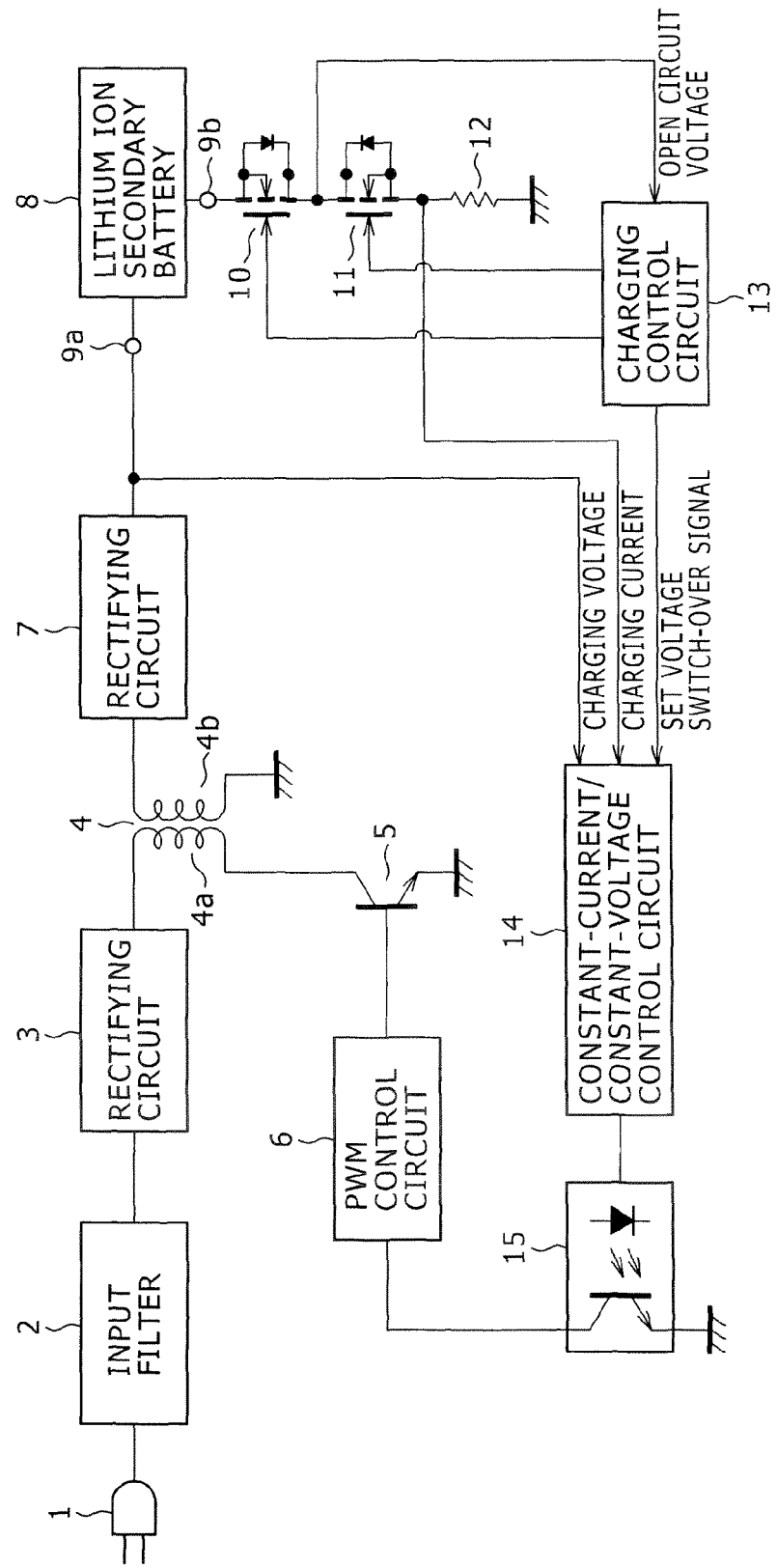
FIG. 1 is a drawing of an embodiment of a charger for lithium ion secondary battery of the present invention.

FIG. 1 shows a configuration of a charger for lithium ion secondary battery according to this embodiment, wherein reference numeral 1 denotes a plug, through which a commercial power of AC 100 V, for example, is supplied. The commercial power supplied through the plug 1 is supplied further through an input filter 2 to a rectifying circuit 3.

Rectified and smoothened DC voltage obtained on the output side of the rectifying circuit 3 is supplied to one end of a primary coil 4a of a transformer 4, the other end of the primary coil 4a is connected to the collector of an npn-type transistor 5 composing a switching element, and the emitter of the transistor 5 is grounded.

The base of the transistor 5 is supplied with a pulse width modulation signal obtained on the output side of a pulse width modulation (PWM) control circuit 6 so as to switch the transistor 5, and thereby an output signal obtained on a secondary coil 4b of the transformer 4 is controlled.

One end of the secondary coil 4b of the transformer 4 is connected to an input side of a rectifying circuit 7, and the other end of the secondary coil 4b is grounded. The rectifying circuit 7 supplies DC voltage for charging, obtained on the secondary coil 4b of the transformer 4, to a positive electrode charging terminal 9a to which the positive electrode of a lithium ion secondary battery 8 to be charged is connected.

A negative electrode charging terminal 9b to which the negative electrode of the lithium ion secondary battery 8 is connected is grounded through a series circuit composed of a reverse-current preventive switch 10, a charging switch 11 and a current-detecting resistor 12.

Figure 2:
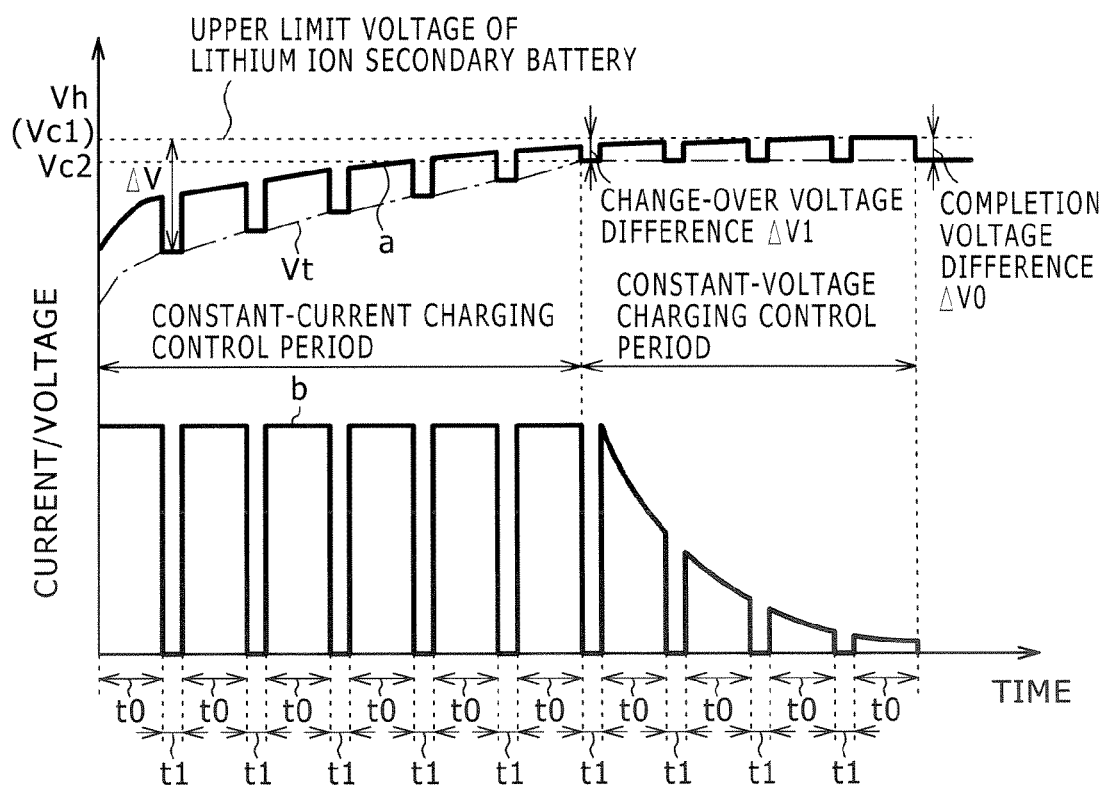
FIG. 2 is a line chart explaining the embodiment of the present invention.
Figure 3:
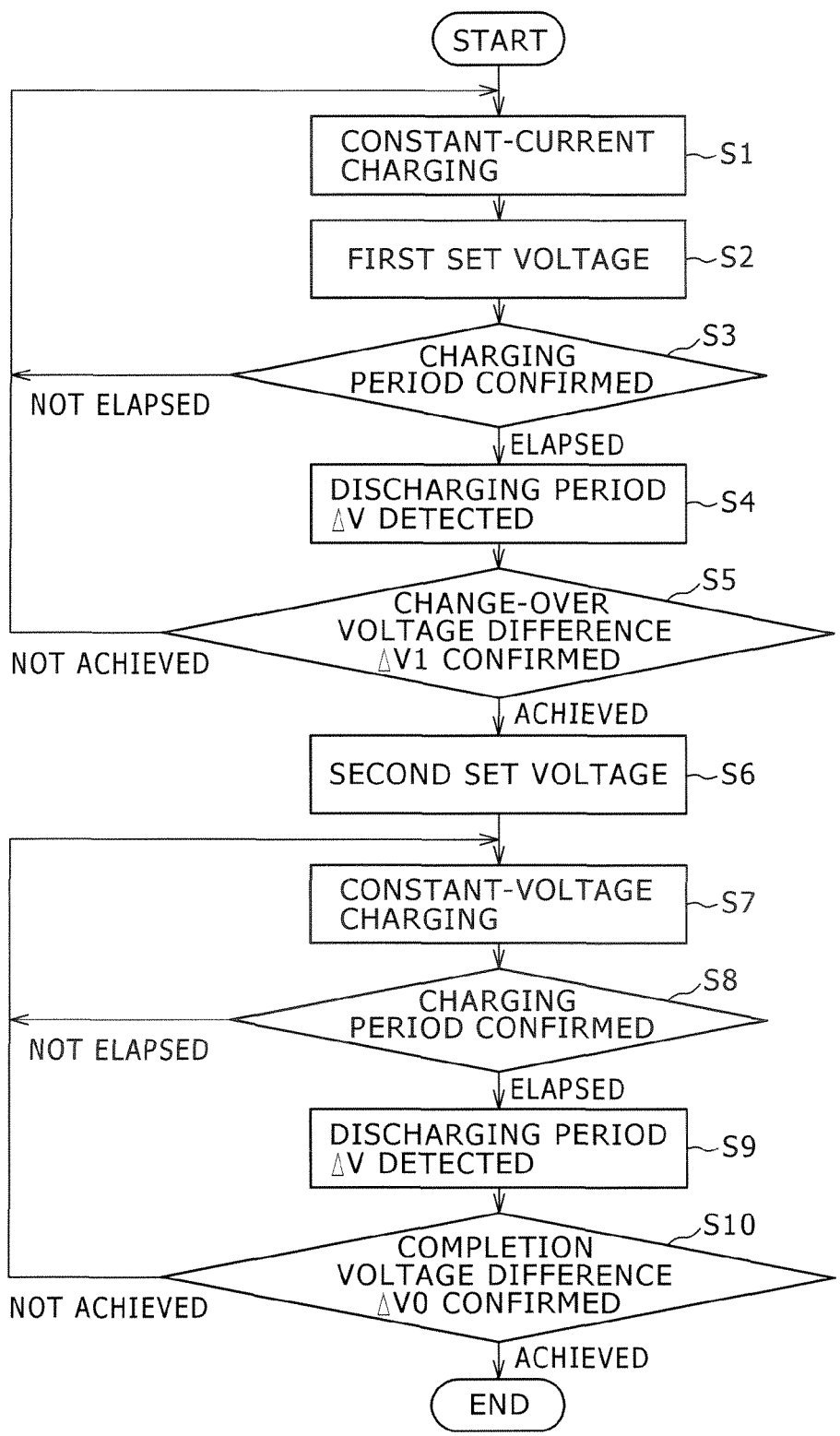
FIG. 3 is a flow chart explaining the embodiment of the present invention.
Figure 4:
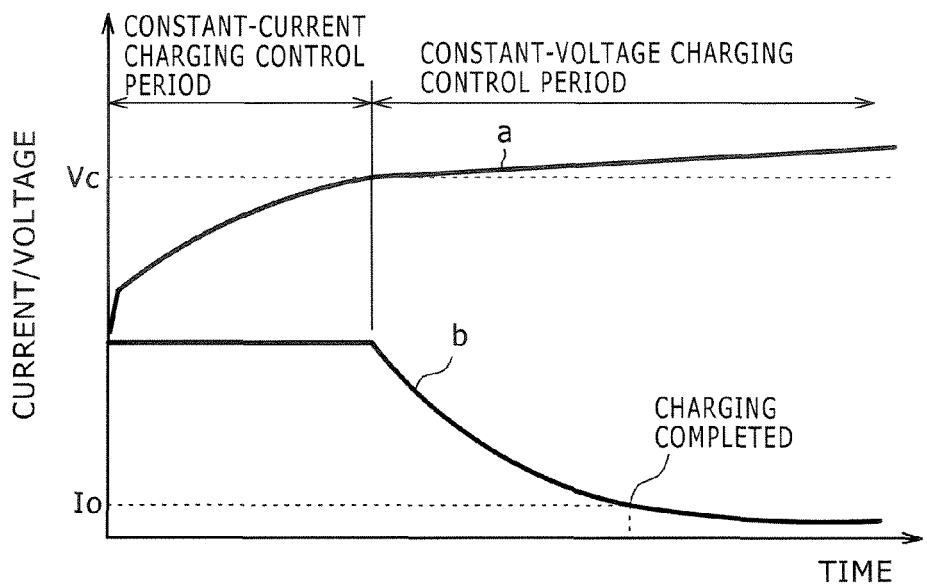
FIG. 4 is a line chart explaining a related art.
Figure 5:
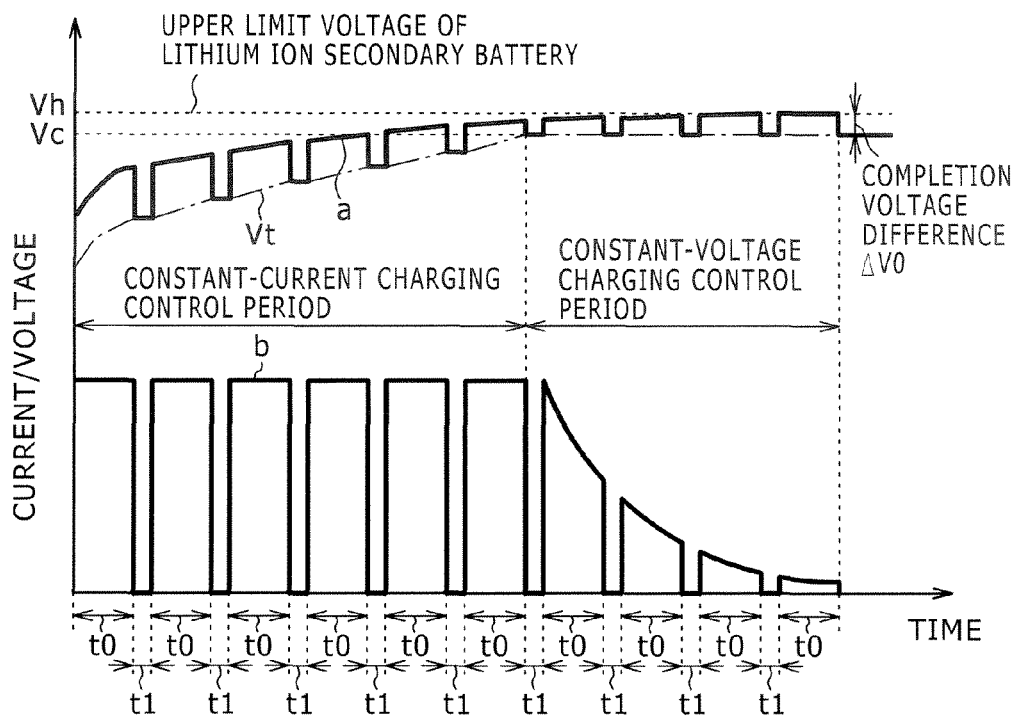
FIG. 5 is a line chart explaining another related art.

The reverse-current preventive switch 10 and the charging switch 11 are controlled by a charging control circuit 13, so as to repeat, as shown in FIG. 2, charging period t0 and opening period t1 at regular intervals.

In this case, the charging period t0 is given as a relatively long, predetermined period, whereas the opening period t1 is given as a relatively short period but sufficient for calculating voltage difference ΔV between the specified voltage of the lithium ion secondary battery 8, for example the upper limit voltage Vh of the lithium ion secondary battery 8, and the open circuit voltage Vt of the lithium ion secondary battery 8.

The charging control circuit 13 operates, in the charging period t0, so as to turn on the reverse-current preventive switch 10 and the charging switch 11, and in the opening period t1, so as to turn on the reverse-current preventive switch 10 and turn off the charging switch 11, to thereby obtain the open circuit voltage Vt of the lithium ion secondary battery 8 at the middle point of connection between the reverse-current preventive switch 10 and thus turned-off charging switch 11, and to obtain the voltage difference ΔV between the specified voltage, which is for example the upper limit voltage Vh of the lithium ion secondary battery, and the open circuit voltage Vt:

$$\Delta V = Vh - Vt.$$

The charging control circuit 13 operates so as to generate a set voltage change-over signal for changing over the set voltage switching the constant-current charging to the constant-voltage charging, when the voltage difference ΔV becomes smaller than a predetermined change-over voltage difference ΔV1, after repeating the trial and error process shown in FIG. 2, and so as to terminate the charging when the voltage difference ΔV falls below a completion voltage difference ΔV0 smaller than the predetermined change-over voltage difference ΔV1.

In this embodiment, a charging voltage "a" obtained on the output side of the rectifying circuit 7 is supplied to the constant-current/constant-voltage control circuit 14, and a charging current "b" obtained at the current-detecting resistor 12 is supplied to the constant-current/constant-voltage control circuit 14, and further from the charging control circuit 13, a set voltage change-over signal for changing over the set voltage switching the constant-current charging to the constant-voltage charging is supplied to the constant-current/constant-voltage control circuit 14, when the voltage difference ΔV between the specified voltage, which is for example the upper limit voltage Vh of the lithium ion secondary battery, and the open circuit voltage Vt becomes smaller than a predetermined change-over voltage difference ΔV1, after the trial and error process.

In this embodiment, so far as the set voltage change-over signal is not supplied from the charging control circuit, and until the voltage difference ΔV decreases to as small as the predetermined change-over voltage difference ΔV1, the constant-current/constant-voltage control circuit 14 supplies a control signal commanding the constant-current charging through a photo-coupler 15 to the pulse width modulation control circuit 6, using the upper limit voltage Vh of the lithium ion secondary battery 8, or a first set voltage Vc1 close thereto, as a set voltage causing changing over from the constant-current charging to the constant-voltage charging, and controls the pulse width modulation control circuit 6 using this control signal.

On the other hand, upon being supplied with the set voltage change-over signal from the charging control circuit 13, when the voltage difference ΔV becomes smaller than the predetermined change-over voltage difference ΔV1, the constant-current/constant-voltage control circuit 14 supplies a control signal commanding the constant-voltage charging through the photo-coupler 15 to the pulse width modulation control circuit 6, while setting the set voltage for causing changing-over from the constant-current charging to the constant-voltage charging to the second set voltage Vc2 lower than the first set voltage Vc1, and controls the pulse width modulation control circuit 6 using this control signal.

Next, the operations of the above-described embodiment will be explained referring to a flow chart described in FIG. 3.

In this illustrated example, at the start of charging of the lithium ion secondary battery 8, the constant-current charging is allowed to proceed (step S1), and the set voltage causing changing-over from the constant-current charging to the constant-voltage charging is adjusted to a relatively high voltage in a range not exceeding the upper limit voltage Vh of the lithium ion secondary battery 8, for example to the upper limit voltage Vh, or the first set voltage Vc1 close thereto (step S2).

In step S3, whether the charging period t0 has elapsed or not is judged, and if the charging period t0 has not elapsed yet, steps S1 and S2 are repeated to proceed the constant-current charging. If it was judged in step S3 that the charging period t0 has elapsed, and the cycle has entered the opening period t1, the voltage difference ΔV between the specified voltage, which is for example the upper limit voltage Vh, and the open circuit voltage Vt of the lithium ion secondary battery is detected (step S4).

Next, whether the voltage difference ΔV fell below the predetermined change-over voltage difference ΔV1 or not is confirmed (step S5). If the voltage difference ΔV remain not smaller than the change-over voltage difference ΔV1, the above-described steps S1, S2, S3, S4 and S5 are repeated, so as to proceed the constant-current charging.

If it was judged in step S5 that the voltage difference ΔV fell below the change-over voltage difference ΔV1, the set voltage causing changing-over from the constant-current charging to the constant-voltage charging is adjusted to the second set voltage Vc2, which is lower than the fist set voltage Vc1, as shown in FIG. 2 (step S6), so as to proceed the constant-voltage charging (step S7).

Whether the charging period t0 has elapsed or not is judged in step S8, and if the charging period t0 has not elapsed, the constant-voltage charging is repeated, whereas it was judged in step S8 that the charging period t0 has elapsed and the cycle has entered the opening period t1, the voltage difference ΔV is detected (step S9).

Next, in step S10, whether the voltage difference ΔV fell into a range not exceeding the completion voltage difference ΔV0 which indicates completion of the charging is confirmed, and if the voltage difference ΔV was found to remain not smaller than the voltage difference ΔV0 which indicates completion of the charging, steps S7, S8, S9 and S10 are repeated, so as to repeat the constant-voltage charging.

If it was judged in step S10 that the voltage difference ΔV fell into a range not exceeding the completion voltage difference ΔV0 which indicates completion of the charging, the charging is terminated.

This embodiment was configured so as to perform constant-current charging at the first set voltage Vc1 which is set relatively high in a range not exceeding the upper limit voltage Vh of the lithium ion secondary battery 8, so far as the voltage difference ΔV between the specified voltage and the open circuit voltage of the lithium ion secondary battery 8 does not exceed a predetermined change-over voltage difference ΔV1, so that the charging time under constant current can be elongated, and thereby the charging time required up to completion of the charging can be shortened, and also configured so as to perform constant-voltage charging at the second set voltage Vc2, which is lowered from the first set voltage Vc1, when the voltage difference ΔV becomes smaller than the change-over voltage difference ΔV1, so that the over-voltage, and consequent degradation of the lithium ion secondary battery 8 are avoidable.

It is to be noted that the present invention is not limited to the above-described embodiment, and of course may be modified into various configurations, without departing from the spirit of the present invention.

The present invention contains subject mater related to Japanese Patent Application No. JP2006-081619 filed in the Japanese Patent Office on Mar. 23, 2006, the entire contents of which being incorporated herein by reference.

What is claimed is:

1. A charger for a lithium ion secondary battery comprising:
   a series circuit of a transistor reverse-current preventive switch, a transistor charging switch and a current-detecting resistor, the reverse-current prevention switch being continuously directly connected to a negative electrode of a lithium ion secondary battery to be charged, and the current detecting resistor being connected between the charging switch and a ground;
   a rectifying circuit connected on a first side to a transformer and directly connected on a second side to a positive terminal of the lithium ion secondary battery;
   a charging control circuit configured to control said reverse-current preventive switch and said charging switch, to make said lithium ion secondary battery repeat charging and opening at regular intervals, to detect a voltage difference between a specified voltage which is an upper limit voltage of the lithium ion secondary battery and an open circuit voltage of said lithium ion secondary battery during said opening at a position directly between the reverse-current preventive switch and the charging switch, and to generate a change-over signal when the detected voltage difference becomes smaller than a predetermined change-over voltage difference; and
   a constant-current/constant-voltage control circuit configured to cause constant-current charging at a first set voltage which is set in a range not exceeding the upper limit voltage of said lithium ion secondary battery, when said voltage difference does not exceed the predetermined change-over voltage difference, and configured to cause constant-voltage charging at a second set voltage, which is lowered from said first set voltage based on the change-over signal received from the charging control circuit.

2. The charger for lithium ion secondary battery as claimed in claim 1, further comprising:
   a pulse width modulation (PWM) control circuit configured to supply a pulse width modulation signal to a transistor to switch the transistor, thereby controlling an output signal appeared on a secondary coil of a transformer.

3. The charger for lithium ion secondary battery as claimed in claim 1, wherein said constant-current/constant-voltage control circuit supplies a control signal allowing the constant-current charging to proceed at said first set voltage, which is set relatively high in a range not exceeding the upper limit voltage of said lithium ion secondary battery, through a photo-coupler to a pulse width modulation (PWM) control circuit, when said voltage difference does not exceed a predetermined change-over voltage difference, and thereby controls said pulse width modulation control circuit using said control signal.

4. The charger for lithium ion secondary battery as claimed in claim 1, wherein said constant-current/constant-voltage control circuit supplies a control signal allowing the constant-voltage charging to proceed at said second set voltage, which is lowered from said first set voltage, through a photo-coupler to a pulse width modulation (PWM) control circuit based on the change-over signal received from the charging control circuit, and thereby controls said pulse width modulation control circuit using said control signal.

5. The charger for lithium ion secondary battery as claimed in claim 1, wherein said constant-current/constant-voltage control circuit terminates constant-voltage charging at the second set voltage when the voltage difference becomes smaller than a predetermined completion voltage difference which is based on the upper limit voltage of the lithium ion secondary battery.

6. The charger for lithium ion secondary battery as claimed in claim 1, wherein the charging control circuit detects the voltage difference between the specified voltage and the open circuit voltage of said lithium ion secondary battery during the constant-current charging and the constant-voltage charging.

7. The charger for lithium ion secondary battery as claimed in claim 1,
   wherein the constant-current/constant-voltage control circuit is further configured to obtain a charging voltage at a position directly between the rectifying circuit and the positive electrode of the lithium ion secondary battery, and to cause constant-voltage charging at the second set voltage based on the obtained charging voltage.

8. The charger for lithium ion secondary battery as claimed in claim 1, wherein the reverse-current preventive switch is an N-type MOSFET transistor and the charging switch is an N-type MOSFET transistor.

9. The charger for lithium ion secondary battery as claimed in claim 1, wherein the reverse-current preventive switch and the charging switch are both on during the charging, and the reverse-current preventive switch is on and the charging switch is off during the opening.

10. A method, implemented on a charger, of charging a lithium ion secondary battery for repeating charging and opening of the lithium ion secondary battery at regular intervals, the method comprising:

detecting, at the charger including a series circuit of a transistor reverse-current preventive switch, a transistor charging switch and a current-detecting resistor, the reverse-current prevention switch being continuously directly connected to a negative electrode of the lithium ion secondary battery, and the current detecting resistor being connected between the charging switch and a ground, a voltage difference between a specified voltage which is an upper limit voltage of the lithium ion secondary battery and an open circuit voltage of said lithium ion secondary battery during said opening at a position directly between the reverse-current preventive switch and the charging switch connected between the negative electrode of the lithium ion secondary battery and the ground;

generating, at the charger, a change-over signal when the detected voltage difference becomes smaller than a predetermined change-over voltage difference;

performing, at the charger, constant-current charging at a first set voltage which is set in a range not exceeding an upper limit voltage of said lithium ion secondary battery, when said voltage difference does not exceed a predetermined change-over voltage difference;

performing, at the charger, constant-voltage charging at a second set voltage, which is lowered from said first set voltage, based on the received change-over signal; and terminating, at the charger, the charging when said voltage difference becomes smaller than a predetermined completion voltage difference, wherein the charger further includes a rectifying circuit connected on a first side to a transformer and directly connected on a second side to a positive terminal of the lithium ion secondary battery.

11. The method of charging a lithium ion secondary battery as claimed in claim 10, further comprising:

supplying a pulse width modulation signal to a transistor to switch the transistor, to thereby control an output signal appeared on a secondary coil of a transformer based on pulse width modulation (PWM) control.

* * * * *